United States Patent
Enuka et al.

(10) Patent No.: US 11,106,703 B1
(45) Date of Patent: Aug. 31, 2021

(54) CLUSTERING OF STRUCTURED AND SEMI-STRUCTURED DATA

(71) Applicant: BigID Inc, New York, NY (US)

(72) Inventors: Yehoshua Enuka, Gimzo (IL); Eyal Sacharov, Herzliya (IL); Meghan Mergui, Ramat Gan (IL)

(73) Assignee: BIGID INC, New York, NY (US)

( * ) Notice: Subject to any disclaimer, the term of this patent is extended or adjusted under 35 U.S.C. 154(b) by 0 days.

(21) Appl. No.: 17/148,074

(22) Filed: Jan. 13, 2021

(51) Int. Cl.
*G06F 7/00* (2006.01)
*G06F 16/28* (2019.01)
*G06F 16/22* (2019.01)

(52) U.S. Cl.
CPC ........ *G06F 16/285* (2019.01); *G06F 16/2237* (2019.01); *G06F 16/2255* (2019.01)

(58) Field of Classification Search
CPC . G06F 16/285; G06F 16/2237; G06F 16/2235
USPC .................................................. 707/600–899
See application file for complete search history.

(56) References Cited

U.S. PATENT DOCUMENTS 8,379,725 B2 * 2/2013 Kuzuya .............. H04N 19/51
375/240.16

OTHER PUBLICATIONS https://en.wikipedia.org/wiki/SimHash (Oct. 4, 2020).
Charikar, Moses S. "Similarity estimation techniques from rounding algorithms." Proceedings of the thiry-fourth annual ACM symposium on Theory of computing. 2002.
MinHash, https://en.wikipedia.org/wiki/MinHash (Oct. 4, 2020).
Whitmore, Ben, "Simhash and solving the hamming distance problem: explained", Aug. 6, 2019 (retrieved at benwhitmore.altervista.org/simhash-and-solving-the-hamming-distance-problem-explained/?doing_wp_cron=1611061136.8203380107879638671875).
Attenberg, Josh, et al. "Collaborative email-spam filtering with the hashing trick." CEAS, Jul. 16, 2009.

* cited by examiner

*Primary Examiner* — Isaac M Woo
(74) *Attorney, Agent, or Firm* — Browdy and Neimark, PLLC

(57) ABSTRACT

The presently disclosed subject matter includes a computerized method and system of clustering data-subsets of one or more structured or semi-structured data sources, each data-subset comprising data-values. For each data-subset (e.g. column) in a group of data-subsets extracted from the one or more structured or semi-structured data sources, a respective vector indicative of characters' position distribution in data-values in the data-subset is generated, thereby giving rise to a group of vectors; for each vector in the group of vectors, a respective proxy hash value is calculated, and data-subsets of respective proxy hash values are assigned to clusters according to similarity between the respective proxy hash values and between the respective vectors.

30 Claims, 8 Drawing Sheets

For each column in the cluster, calculating a respective MinHash vector
701

Comparing between MinHash values of different columns in the cluster
703

Storing the similarity score between different columns determined based on MinHash comparison results
705

FIG. 7

CLUSTERING OF STRUCTURED AND SEMI-STRUCTURED DATA

FIELD OF THE PRESENTLY DISCLOSED SUBJECT MATTER

The presently disclosed subject matter relates to computerized systems and methods of database management.

BACKGROUND

Organizations of all sorts use ever growing databases for storing and analyzing data. These organizations face different challenges in managing and curating the huge amounts of data across multiple data sources. These challenges also include those which are related to data discovery and data governance such as those prescribed by the General Data Protection Regulation (GDPR).

GENERAL DESCRIPTION

A structured data source is one whose elements are addressable for effective analysis. This includes, for example, relational databases organized in tables consisting rows and columns (e.g., SQL databases). A semi-structured data source is one that is not stored in a relational database but that has some organizational properties that make it easier to analyze. This includes for example non-SQL databases, including but not limited to MongoDB. In the following discussion, unless specifically indicated otherwise, the term "data source" is used to include both a structured and a semi-structured data source, and the term "data-subset" is used to include a sub-component of structured or semi-structured data source. Examples of data-subsets in structured data include columns and rows, and an example of a data-subset in a semi-structured data is a field retrieved from a plurality of documents in a MongoDB database.

As used herein the term "clustering" is used to include the grouping of data-subsets according to similarity between certain characteristics of the data-values they contain. Clustering similar data-subsets of structured or semi-structured data sources, can greatly facilitate the management of data assets, and is therefore often desired during database analysis. Following the clustering, data-subsets can be classified and labeled (e.g., with a user-friendly name) accurately and consistently across the system, allowing convenient management and analysis of the stored data. Furthermore, clustering of data-subsets can assist in removal of redundant, identical or near-identical data-subsets, and thus improve both storage capacity and performance.

The presently disclosed subject matter includes a computerized system and method which provides a solution to the challenge of data-pattern matching and data-content matching in a scalable manner. As used herein the term "data-pattern matching" refers to clustering (or grouping) of data-subsets according to similarity in their pattern (pattern-based data similarity), and the term "data-content matching" to clustering (grouping) of data-subsets according to similarity in their content.

In contrast to common approaches that rely for example on schema matching (using regular expressions) or data-subset (e.g., column) name similarity, which many times result in false negatives and false positives, the technique disclosed herein utilizes metadata features characterizing the content stored in the data-subsets which can be uniformly applied on databases with no need to have prior knowledge and consider the specific content stored therein. This allows to considerably improve the accuracy and efficiency of the clustering. In addition to data-pattern matching, the presently disclosed subject matter also includes a fast and efficient data-content matching technique.

Performance and scale considerations are important when analyzing large collections of data sources (for example, it is not unusual for an organization to have 10 million tables with 10 columns or more in each). Due to performance bottleneck, pairwise comparisons of all data-subsets (e.g., columns) and fields should be avoided. To overcome the challenge of scalability of pairwise comparisons between different data-subsets, it is suggested herein to use proxy hash fingerprints, calculated based on the data-subsets values and metadata. The comparison of proxy hash fingerprints serves as a good estimator of similarity tests, such as cosine and Jaccard similarity, between vectors representing the original data-subsets (e.g., columns). The use of these fingerprints as further explained below, significantly reduces the search space for similar data-subsets (e.g., columns) and enables to significantly scale up the search and comparison, in some examples to hundreds of millions of data-subsets. The results of the data-pattern matching and data-content matching between different data-subsets can then be propagated into a graph database, which enables to query the database and find similar data-subsets using various query parameters.

It is noted that while the following description predominantly refers to relational databases and their components such as tables and columns, this is done by way of example only and should not be construed to limit the scope to relational databases alone. The presently disclosed subject matter can be likewise applied on semi-structured data (e.g., MongoDB).

According to one aspect of the presently disclosed subject matter there is provided a computerized method of clustering between data-subsets (e.g., columns in a relational database) of one or more structured or semi-structured data sources (e.g., tables of a relational database), each data-subset comprising data-values, the method comprising using a processing circuitry for:

generating, for each data-subset in a group of data-subsets extracted from the one or more structured or semi-structured data sources, a respective vector indicative of characters position distribution of data-values in the data-subset (herein "char_position vector") thereby giving rise to a group of vectors;

calculating for each vector in the group of vectors a respective proxy hash value; and performing data-pattern matching comprising:

assigning data-subsets of respective proxy hash values to clusters according to similarity between the respective proxy hash values and between the respective vectors.

In addition to the above features, the method according to this aspect of the presently disclosed subject matter can optionally comprise one or more of features (i) to (xxi) below, in any desired combination or permutation:

I. The computerized method further comprises:

applying a first bitwise comparison between proxy hash values and assigning different proxy hash values to respective blocks according to observed bitwise similarity between the proxy hash values;

the data-pattern matching further comprises:

for each block:

for at least one pair of proxy hash values in the block, applying at least one vector similarity test on respective vectors of the pair of proxy hash values;

and in case the result of the at least one vector similarity test is above a (first) predefined threshold value, assigning the respective data-subsets of the pair of proxy hash values to a common cluster, wherein the data-values in data-subsets assigned to the common cluster share similar data-patterns.

II. The computerized method, wherein the first bitwise comparison includes performing bitwise comparison between respective portions of the proxy hash values.

III. The computerized method further comprising classifying the cluster to a specific type of data.

IV. The computerized method, wherein data-pattern matching further comprises:
for each block:
designating a first proxy hash value from the proxy hash values in the block as a header proxy hash, wherein the header proxy hash is assigned to a respective cluster;
(a) for each of the remaining proxy hash values in the block:
selecting a tested proxy hash value from the block, wherein the at least one vector similarity test is applied on the respective vector of the header proxy hash and the respective vector of the tested proxy hash;
in case the at least one vector similarity test exhibit similarity above a threshold, assigning the respective data-subsets of the tested proxy hash to the respective cluster and removing the tested hash value from the block;
otherwise, retaining the tested proxy hash value in the block;
repeatedly applying (a) on proxy hash values remaining in the block, each time with a different tested proxy hash value.

V. The computerized method further comprising, once all proxy hash values in the block have been selected, designating a new header proxy hash value from the remaining proxy hash values in the block and repeating (a).

VI. The computerized method, wherein (a) further comprises:
in case the at least one vector similarity test exhibits similarity above threshold, combining the respective vector of the header proxy hash and the respective vector of the tested proxy hash value, giving rise to an accumulated vector of the header proxy hash; and
using the accumulated vector in place of the respective vector of the header in the following application of (a).

VII. The computerized method, wherein the data-pattern matching further comprises:
applying a second bitwise comparison between the pair of proxy hash values and applying the at least one vector similarity test on the pair of proxy hash values only if the bitwise comparison shows similarity above a (second) predefined threshold value.

VIII. The computerized method, wherein data-pattern matching further comprises:
for each block:
designating a first proxy hash value from the proxy hash values in the block as a header proxy hash, wherein the header proxy hash is assigned to a respective cluster;
(a) for each of the remaining proxy hash values in the block:
selecting a tested proxy hash value from the block, wherein the second bitwise comparison is applied on the header proxy hash and the tested proxy hash and the at least one vector similarity test is applied on the respective vector of the header proxy hash and the respective vector of the tested proxy hash;
in case the second bitwise comparison and the at least one vector similarity test exhibit similarity above a threshold, assigning the respective data-subsets of the tested proxy hash to the respective cluster and removing the tested hash value from the block;
in case the header proxy hash and the tested hash value do not exhibit bitwise similarity above a threshold, retaining the tested proxy hash value in the block;
repeatedly applying (a) on proxy hash values remaining in the block, each time with a different selected tested proxy hash value.

IX. The computerized method further comprises, once all proxy hash values in the block have been selected, designating a new header proxy hash value from the remaining proxy hash values in the block and repeating (a).

X. The computerized method, wherein (a) further comprises:
in case the second bitwise comparison and the at least one vector similarity test exhibits similarity above a threshold, combining the respective vector of the header proxy hash and the respective vector of the tested proxy hash value, giving rise to an accumulated vector of the header proxy hash; and
using the accumulated vector in the following application of (a) in place of the respective vector of the header.

XI. The computerized method, wherein, calculating for each vector in the group of vectors, a respective proxy hash value comprises using a proxy hash function that retains a correlation between an input vector and a respective output proxy hash value.

XII. The computerized method wherein the proxy hash function is any one of: MinHash function; and SimHash function.

XIII. The computerized method, wherein the one or more vector similarity tests include one or more of: cosine similarity test and Jaccard similarity test.

XIV. The computerized method further comprising, for at least one given cluster:
for each data-subset assigned to the given cluster, calculating a respective proxy hash value, giving rise to a collection of proxy hash values;
comparing between the respective proxy hash values in the collection; and
identifying different data-subsets in the cluster that share overlapping data-values, based on the results of the comparison.

XV. The computerized method, wherein the proxy hash values are sampled proxy hash values, calculated using only a sample of the data-values in each data-subset; the method further comprising: inferring similarity between different data-subsets in the cluster based on the observed similarity between sampled proxy hash values.

XVI. The computerized method, wherein the inferring is performed using the equation Overlap$_{original}$=Overlap$_{sample}$/u$_{sA}$'/u$_{tA}$×u$_{sB}$'/u$_{tB}$)
where:
'overlap' is the number of overlapping sampled data-values in data-subset A and data-subset B;
u$_{sA}$' is a number of unique sampled data-values from data-subsets A;
'u$_{sB}$' is a number of unique sampled data-values from data-subsets B;
'u$_{tA}$' is a number of total unique values from data-subset A; and
'u$_{tB}$' is a number of total unique from data-subset B.
XVII. The computerized method further comprises generating a graph representing the dusters, comprising:
for a given cluster, for each data-subset:
determining whether there exists in the graph a respective node representing a parent table of the data-subset, and, if not, adding the respective node to the graph;
adding, to the respective node, data indicative of the data-subset; and
connecting by an edge any two nodes in the graph that contain data-subsets assigned to the same cluster.
XVIII. The computerized method further comprising adding to the edge data identifying clusters shared by the data-subsets in the nodes connected by the edge.
XIX. The computerized method further comprising adding to the edge information including one or more of:
A. data indicative whether the data-subsets in the nodes connected by the edge contain overlapping data-values; and
B. a summary of the total number of unique and non-unique data-subsets.
XX. The computerized method further comprising generating a graphical user interface enabling a user to interact and query the graph.
XXI. The computerized method further comprising assigning different data sources to a common group based on the number of data-subsets in the data sources which are assigned to the same duster.

According to another aspect of the presently disclosed subject matter there is provided a computerized system of clustering data-subsets of one or more structured or semi-structured data sources, each data-subset comprising data-values, the system comprising at least one processing circuitry configured to:
generate, for each data-subset in a group of data-subsets extracted from the one or more data sets, a respective vector indicative of characters position distribution in data-values in the data-subset, thereby giving rise to a group of vectors;
calculate for each vector in the group of vectors, a respective proxy hash value;
apply a first bitwise comparison and assign different proxy hash values to respective blocks according to observed bitwise similarity between the proxy hash values;
for each block, perform data-pattern matching of respective data-subsets of proxy hash values in the block, comprising:
for any pair of proxy hash values in the block, applying at least one vector similarity test on respective vectors of the pair of proxy hash values;
and in case the result of the at least one vector similarity test is above a predefined threshold value, assigning the respective data-subsets of the pair of proxy hash values to a common cluster, wherein the data-values in data-subsets assigned to the common cluster share similar data-patterns.

According to another aspect of the presently disclosed subject matter there is provided a non-transitory program storage device readable by a computer, tangibly embodying a program of instructions executable by the computer to perform a method of method of data-pattern matching between data-subsets (e.g. columns) of one or more structured or semi-structured data sources (e.g. tables), each data-subset comprising data-values, the method comprising using a processing circuitry for:
generating, for each data-subset (e.g., column) in a group of data-subsets extracted from the one or more structured or semi-structured data sources, a respective vector indicative of characters' position distribution in data-values in the data-subset (herein "char_position vector"), thereby giving rise to a group of vectors;
calculating for each vector in the group of vectors a respective proxy hash value; and
performing data-pattern matching comprising:
assigning columns of respective proxy hash values to clusters according to similarity between the respective proxy hash values and between the respective vectors.

The system and non-transitory program storage device, disclosed in accordance with the presently disclosed subject matter can optionally comprise one or more of features (i) to (xxi) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:
FIG. 7 is a flowchart of operations carried out during data-content matching, in accordance with an example of the presently disclosed subject matter.

DETAILED DESCRIPTION

Figure 1:
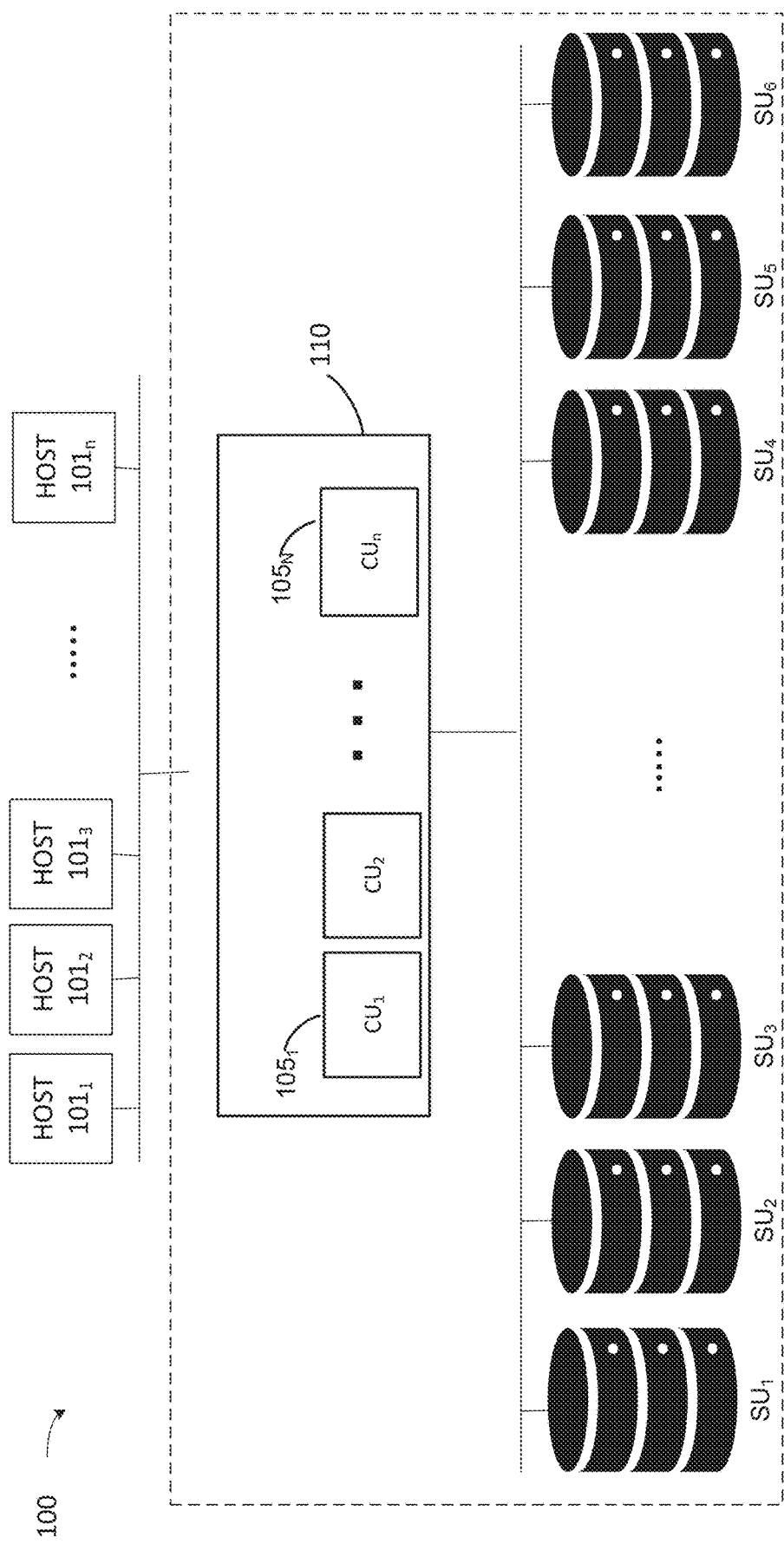
FIG. 1 is schematic illustration of a database system, in accordance with an example of the presently disclosed subject matter.

In the drawings and descriptions set forth, identical reference numerals indicate those components that are common to different embodiments or configurations. Elements in the drawings are not necessarily drawn to scale.
Unless specifically stated otherwise, as apparent from the following discussions, it is appreciated that, throughout the specification, discussions utilizing terms such as "generating", "calculating", "determining", "applying", "performing", "assigning" or the like, include an action and/or processes of a computer that manipulate and/or transform data into other data, said data represented as physical quantities, e.g. such as electronic quantities, and/or said data representing the physical objects.

The terms "computer", "computer device", "computerized device" or the like, should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.). The processing circuitry can comprise, for example, one or more processors operatively connected to computer memory, loaded with executable instructions for executing operations as further described below. For example, control unit 105 described below with reference to FIG. 1 is a computerized device.

The operations in accordance with the teachings herein may be performed by a computer specially constructed for the desired purposes, or by a general-purpose computer specially configured for the desired purpose by a computer program stored in a computer readable storage medium.

As used herein, the phrase "for example," "such as", "for instance" and variants thereof, describe non-limiting embodiments of the presently disclosed subject matter. Reference in the specification to "one case", "some cases", "other cases", or variants thereof, means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately, or in any suitable subcombination.

In embodiments of the presently disclosed subject matter, fewer, more and/or different stages than those shown in FIGS. 3 to 7 may be executed. In embodiments of the presently disclosed subject matter, one or more stages illustrated figures may be executed in a different order, and/or one or more groups of stages may be executed simultaneously.

Figure 2:
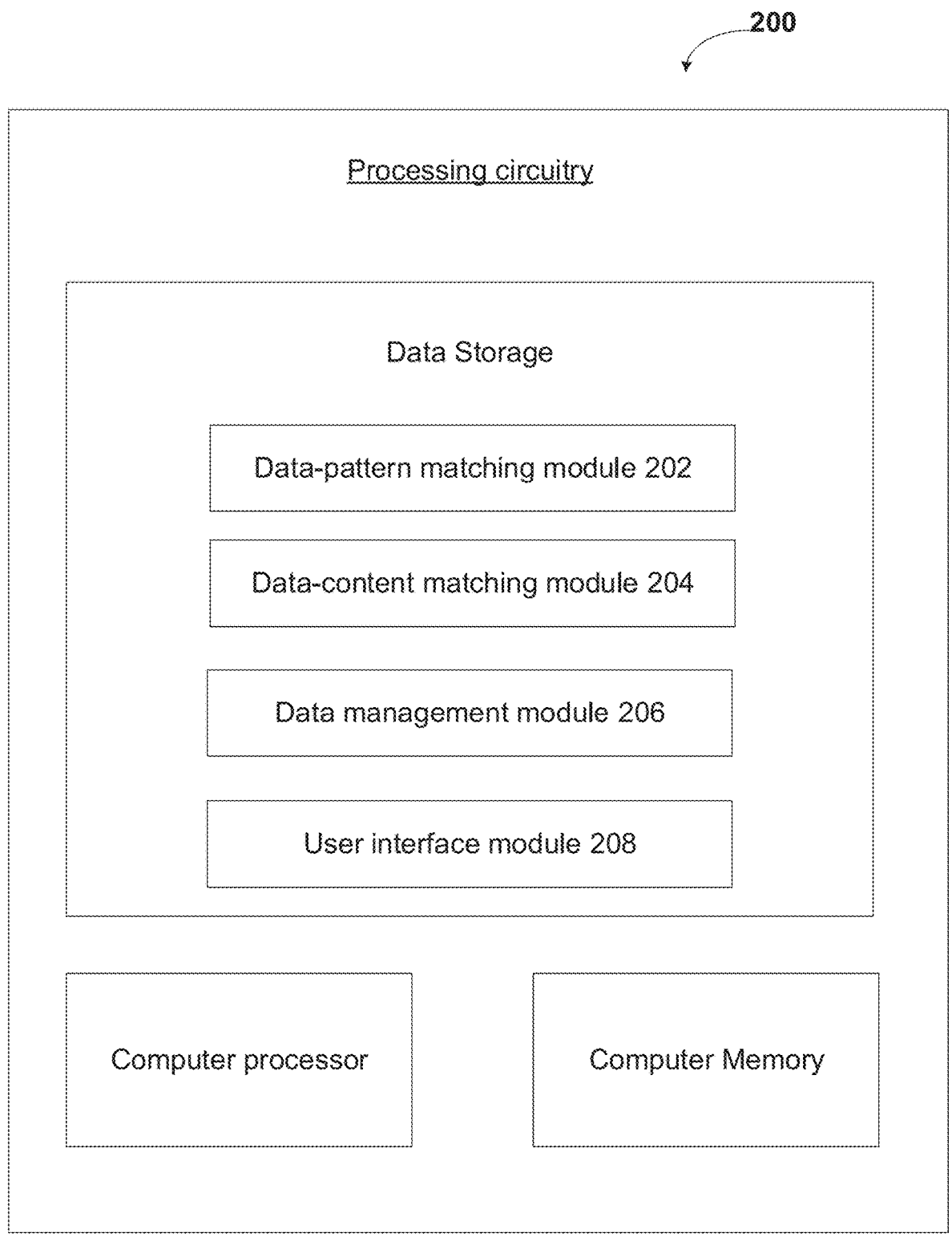
FIG. 2 is a block diagram illustrating a processing circuitry, in accordance with an example of the presently disclosed subject matter.

FIGS. 1 and 2 illustrate a general schematic of the system architecture in accordance with an embodiment of the presently disclosed subject matter. Elements in FIGS. 1 and 2 can be made up of any combination of software and hardware and/or firmware that performs the functions as defined and explained herein. Elements in FIGS. 1 and 2 may be centralized in one location or dispersed over more than one location, in other embodiments of the presently disclosed subject matter, the system may comprise fewer, more, and/or different elements than those shown in FIGS. 1 and 2. For example, FIG. 2 shows a single processing circuitry, while it should be clear to any person skilled in the art that a plurality of processing circuitries can be used instead. Likewise, the specific division of the functionality of the disclosed system to specific parts as described below, is provided by way of example, and other various alternatives are also construed within the scope of the presently disclosed subject matter.

Bearing the above in mind, attention is drawn to FIG. 1, which is a schematic high-level block-diagram of a database system (DBS), according to some examples of the presently disclosed subject matter. DBS 100 includes a physical storage space comprising one or more physical storage units ($SU_{1-n}$), each physical storage unit comprising one or more storage devices configured to store data, e.g., in the form of relational tables. Storage devices may be any one of Hard Storage devices (HDD) or Solid-State Drives (SSD, comprising for example, a plurality of NAND elements), DRAM, non-volatile RAM, or any other computer storage device or combination thereof. Physical storage units ($SU_{1-n}$) can be consolidated in a single unit or can be otherwise distributed over one or more computer nodes connected by a computer network, where each node can be located at a different location and in some cases be owned by a different owner.

DBS 100 can further comprise a database management layer 110 comprising one or more control units (CU $105_{1-n}$) which are computerized devices, operatively connected to the physical storage space and to one or more hosts ($101_{1-n}$), and configured to control and execute various operations in the DBS. These operations include for example, data retrieval requests, received from users (interacting with the DBS via hosts ($101_{1-n}$) or other applications interacting with the DBS. Various other examples of operations performed by the control units are described in more detail below. A host includes any computer device which communicates with the database management layer 110 e.g., a PC computer, working station, a Smartphone, cloud host (where at least part of the processing is executed by remote computing services accessible via the cloud), or the like.

FIG. 2 is a block diagram illustrating a processing circuitry which can be implemented in a control unit 105 being part of database management layer 110, according to some examples of the presently disclosed subject matter. Processing circuitry 200 can comprise one or more computer processors operatively connected to a computer storage medium. The processing circuitry can be configured to execute functional modules in accordance with computer-readable instructions implemented on a non-transitory computer-readable storage medium. For simplicity, such functional modules are referred to hereinafter as components of the processing circuitry. A more detailed description of the operations of processing circuitry 200 is disclosed below with reference to the following figures.

Figure 3:
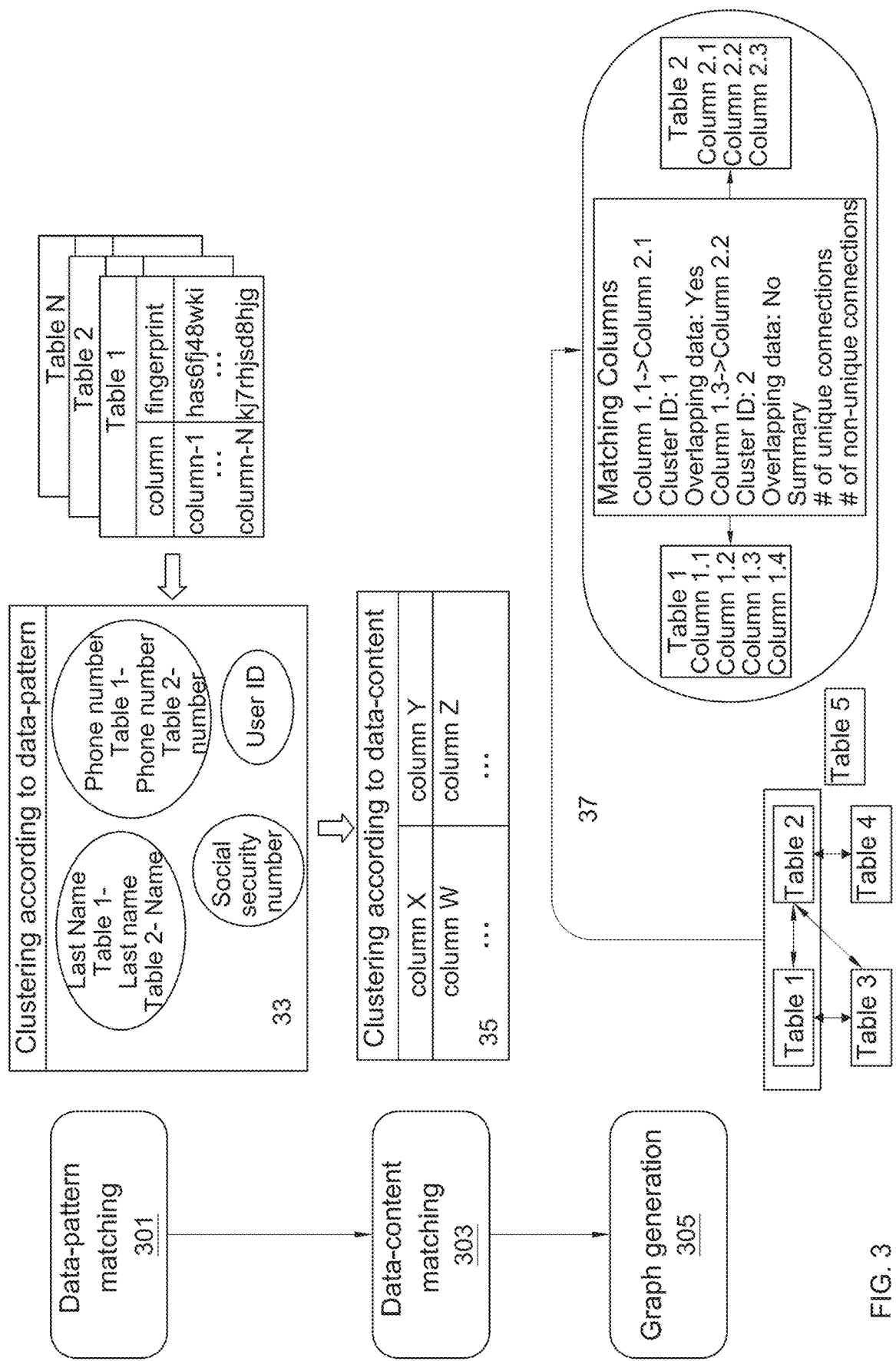
FIG. 3 is a high-level flowchart of operations carried out in accordance with an example of the presently disclosed subject matter.

FIG. 3 is a flowchart, showing a high-level view of operations carried out, according to some examples of the presently disclosed subject matter. Operations in FIG. 3, (as well as FIGS. 4 to 7 below) are described with reference to corresponding functional elements which are illustrated in FIG. 2. However, this is done by way of example only and should not be construed to limit the scope of the presently disclosed subject matter to the specific components and/or design exemplified in FIG. 2.

The process disclosed herein with reference to FIG. 3 includes data-pattern matching (301); data-content matching (303), and graph representation (305). Data-pattern matching, executed for example by data-pattern matching module 202, includes in general the processing of data-subsets (e.g., columns) extracted from one or more data sources (tables 1 . . . N) and the grouping in clusters (33) of data-subsets having similar data-patterns, thereby enabling automatic classification of columns according to the type of data they contain. For example, assuming cell-phone numbers share the following 10 characters pattern: 0@#-#######, where # can be replaced by any digit and @ can be replaced by any digit other than 0. By identifying all columns that share this pattern, ail columns that contain cell-phone numbers can be identified and classified accordingly.

Data-content matching, executed for example by data-content matching module 204, includes the identification of different data-subsets (e.g. columns) assigned to the same cluster that comprise overlapping data-values and determining the overall similarity of data-values in the different data-subsets.

Following data-pattern matching and data-content, matching, a graph representation (37) of the data-pattern matching and data-content matching output is generated (e.g., by data management module 206.

As further explained below, the user interface module 208 is configured to generate a user interface enabling a user to interact, with the system, issue queries and requests, and view the retrieved information including the results of the clustering processes disclosed herein.

Figure 4:
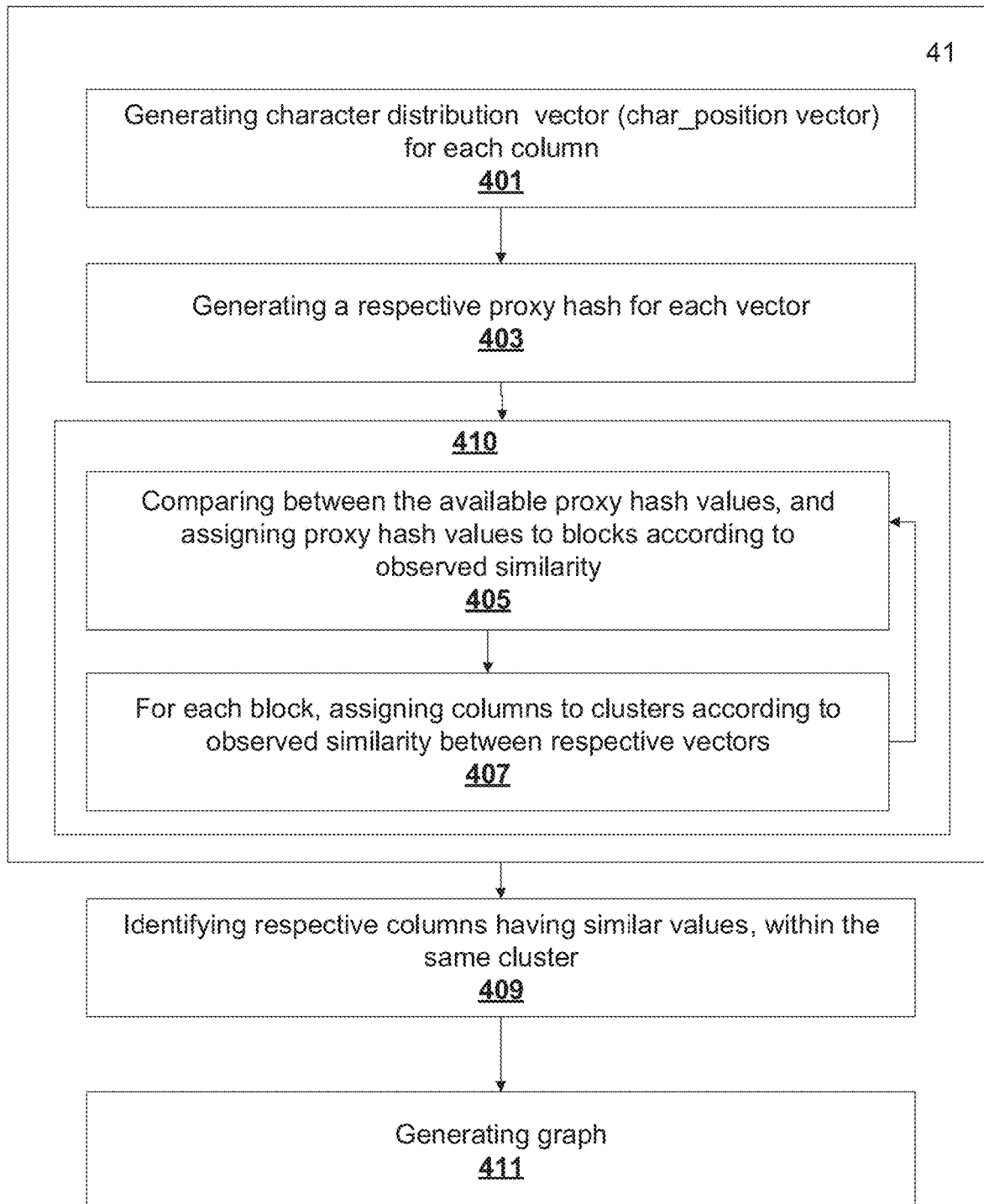
FIG. 4 is a flowchart illustrating operations carried out in accordance with an example of the presently disclosed subject matter.

Attention is reverted to FIG. 4 showing a more detailed flowchart of operations carried out, according to some examples of the presently disclosed subject matter. Operations described with reference to FIGS. 4-6 can be executed for example by data-pattern matching module 202.

Consider for example a collection of structured data sources (e.g. a distributed database that comprises multiple tables each having one or more columns) where the process starts by scanning the structured data sources, extracting (part or all of the) data-subsets—in this example columns—and generating, for each extracted column, a respective vector storing character position frequencies (referred to herein as "char_position vector") (401). Finding columns which store values having a similar pattern across large scale databases, which are diverse and many times noisy, is a challenging task. One challenge is to define an accurate and easily maintainable representation of the pattern of the values in each data-subset. It is suggested herein to use a char_position vector, which encodes the pattern of the data-values stored in a respective data-subset. The vector provides a distribution scheme of the character pattern across all values stored in each data-subset.

Given a collection of data sources (e.g., tables), a respective vector can be generated for various parts thereof. In some examples, a respective vector is generated for each column in the collection. In other examples, a respective vector is generated only to a selected group of columns which include only a subgroup of the columns in the collection. As further mentioned below, a respective vector can also be generated for a subset of the vectors in of a single table, or for an entire table.

In some examples, only a portion of each data-subset is processed (e.g. a sample of values randomly selected from the data-subset), i.e. the char_position vector is generated only for a sample extracted from a respective column. A sample is normally sufficient for the data-pattern matching process.

Figure 5:
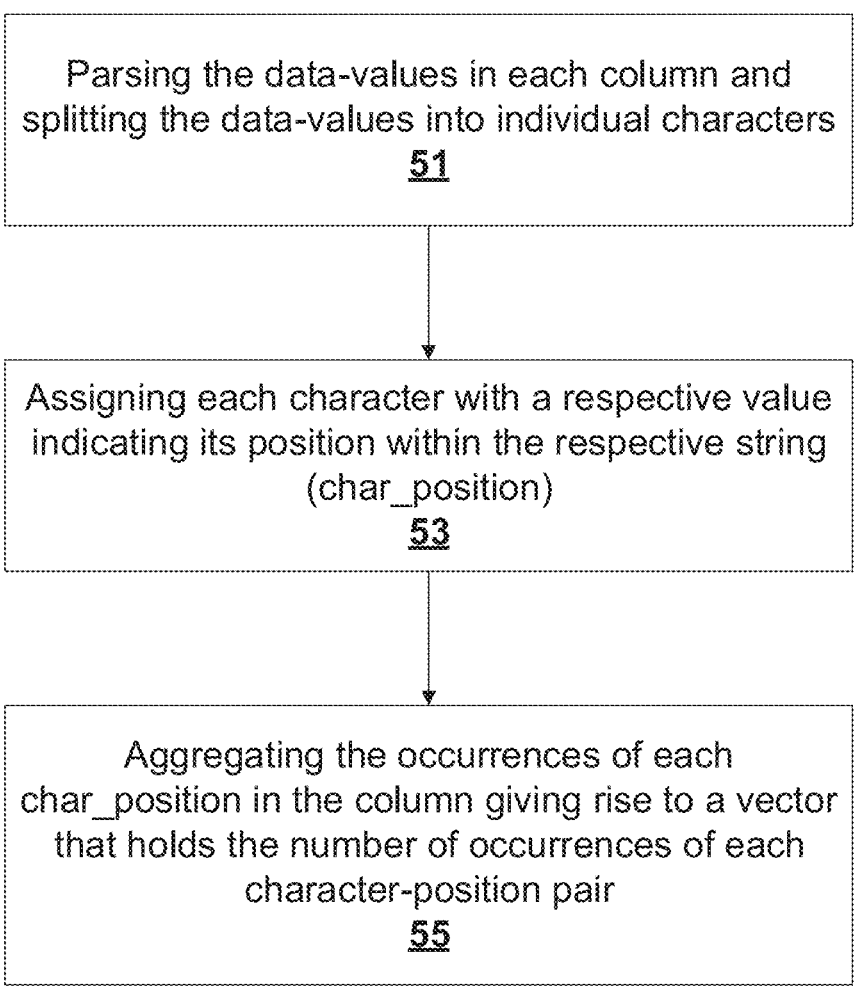
FIG. 5 is a flowchart illustrating operations carried out in accordance with an example of the presently disclosed subject matter.

FIG. 5 is a flowchart, describing operations carried out during the generation of char_position vectors, according to some examples of the presently disclosed subject matter. At block 51 the data-values (strings) in each column are parsed and split into individual characters. At block 53, each character in each string is assigned with a respective value indicating its position within the respective string, giving rise to a character-position pair (char_position). At block 53 the occurrences of each char_position in the column is aggregated, giving rise to a vector that holds the number of occurrences of each character-position pair (referred to here below as "char position vector").

Table 1 below shows an example of a char_position vector generated for the following column:

| |
|---|
| YES |
| NO |
| YES |

The above column includes three data-values: "Yes", "No", and "Yes"', and the table below which indicates the frequency of occurrence of each character in each position.

TABLE 1

| | Character-position pair | | | | |
|---|---|---|---|---|---|
| | Y_0 | N_0 | e_1 | o_1 | s_2 |
| # of occurrences | 2 | 1 | 2 | 1 | 2 |

The annotation above indicates that:

there are two occurrences of the character 'Y' positioned as the first character in a data-value in a given column;

there is one occurrence of the character 'N' positioned as the first character in a data-value in the given column;

there are two occurrences of the character 'e' positioned as the second character in a data-value in the given column;

there is one occurrence of the character 'o' positioned as the second character in a data-value in the given column; and there are two occurrences of the character 's' positioned as the third character in a data-value in the given column.

In some examples, to avoid the need to go over ail the columns once to get all the char_position combinations that exist in all the values across ail columns, the hashing trick is used. In short, a vectorizer that uses the hashing trick applies a hash function h to the features (i.e., char_position), and then uses the hash values directly as feature indices. In other words, instead of assigning unique indices to each char__position feature, the hashing algorithm applies a hash function on the char__position string and uses the numerical output as the index of the specific char_position feature. For example, instead of assigning the unique index 0 to the Y__0 char_position feature, the hashing trick algorithm applies a hash function to the string 'Y_0' and uses the output of the hash function (e.g., 47) as the index of that specific char_ position feature. To build a vector of a predefined length, the algorithm applies the modulo operation on the resulting hash values. Importantly, even if some of the hashed values collide, it usually does not significantly affect downstream computations.

It is noted that while the above example describes the generation of a char_position vector for a single column, this should not be construed as limiting and in other examples, a char_position vector can be generated for two or more columns, or even for the entire table. In the example of a sample that includes a plurality of columns of a table (e.g., the entire table), data indicative of the frequency of occurrence of each character in each position is determined for each data value in the sample (e.g., each ceil in the selected sample) rather than only data values in a column. The data is then aggregated into a single char_position vector representing the entire sample. In case this is applied on an entire table, if provides for a single char_position vector representing the entire table, which enables to apply data-pattern matching and data-content matching between entire tables rather than columns. Accordingly, it should be understood that the term "data-subset" as used herein can also refer to an entire data source.

Reverting to FIG. 4, following the generation of a char_position vector, a corresponding proxy hash value is calculated for each vector (block 403). As demonstrated by the sequence, Column=>char_position vector=>proxy hash, a char_position vector is calculated for each column, and a respective proxy hash is calculated for each vector. As mentioned above, in some examples, a char_position value is calculated for each column, using only a sample of the values in the column.

According to some examples, a proxy hash function is applied on all char_position vectors. A proxy hash function is a type of hash function, which generates respective hash value outputs which retain a correlation to the similarity between original input values. In the current examples, a proxy hash function applied on a given char_position vector provides a hash value, where the hamming distance between different proxy hash values retains a correlation to the similarity between original vectors. This enables to deduce information with respect to the similarity between char_position vectors, based on the comparison of their respective proxy hash values. Notably, while two proxy hash values generated for highly similar original input values may not be as similar, in some examples they would preserve at least 85% of the similarity of the original values. Hence the use of the term "proxy". Examples of proxy hash functions include SimHash and MinHash.

In cases where SimHash is used as the proxy hash function, the following operations are carried out. For each item in the char_position vector, the vector representing a list of features and their respective frequencies (e.g. [('Y_0', 120), ('N_0', 60), ('e_1', 120), ('o_1', 60), ('s_2', 120)]), a hash value is calculated for each feature in the set using some type of hash function (e.g. FNV-1a), giving rise to a collection of hash values and their weights, wherein the weight reflects the number of times the respective feature appears in the column. The collection of hash values are then combined into a single SimHash value.

According to one example, the hash values in the collection are combined into a single SimHash by calculating a kind of bitwise aggregate of all hash values in the collection. The aggregate value is calculated for each $i^{th}$ bit by aggregating the weight of each hash of a respective feature multiplied by +1 if the value of the $i^{th}$ bit in the hash is 1 or by −1 if the value of the $i^{th}$ bit is 0. Once a SimHash value is calculated for each char_position vector, the SimHash values can be sorted according to their value, thus placing similar SimHashes in proximity, making it easy to find SimHash values with small bitwise Hamming distance.

The available proxy hash values (referred to below also as "fingerprints" or FP in short) generated for different char_position vectors are compared, and those that exhibit similarity greater than a certain threshold are assigned to the same "block", giving rise to a group of blocks (405). At the onset of the process in the first iteration, "the available proxy hash values" include the entire pool of proxy hash values. As the process proceeds and proxy hash values which are assigned to clusters are removed from the pool of hash values, the number of "available proxy hash values" is continuously reduced.

According to some examples, assignment of proxy hash values to blocks is done based on the comparison of a predefined portion of the proxy hash (referred to herein as "proxy hash portion" or "prefix") and not the entire hash. According to a first example, in a 64 bits proxy hash, the proxy hash portion comprises the first 8 bits (8-bit prefix) on the left side (first 8 most significant bits). According to a second example, in a 64 bits proxy hash, the proxy hash portion comprises the first 16 bits (16-bit prefix) on the left side. According to a third example, in a 64 bits proxy hash, the proxy hash portion comprises the first 32 bits (32-bit prefix) on the left side. By using part of the bits for comparison, rather than the entire hash, the processing load of these operations is reduced.

As further disclosed below, in some examples, FPs are divided into sections, each section comprising a certain number of bits. According to a first non-limiting example, in case of a 64 bits proxy hash, the FPs are divided into 8 sections each comprising 8 bits. According to a second non-limiting example, in case of a 64 bits proxy hash, the fingerprints are divided into 4 sections each comprising 16 bits. The proxy hash portion can be defined to comprise one or more sections, e.g., according to the first example, a proxy hash portion of 2 sections equates a 16-bit proxy hash portion. Notably, a fingerprint can be divided into a number of sections of unequal length such that each section contains a different number of bits.

In some examples, the FPs (e.g., in case of SimHash values) are sorted according to similarity of bits in their proxy hash portions (referred to herein also as a "first bitwise comparison" and the similarity referred to herein also as "first bitwise similarity"). The sorting works as an initial screening method, as it provides basic information regarding similarity between hash values, and enables to limit subsequent comparisons, which are more processing-intensive, to columns assigned to the same block, and thus reduces the overall processing load of the entire data-pattern matching process. Notably, sorting is significantly more efficient, than pairwise comparisons. According to some examples, the similarity threshold defining sufficient similarity between proxy hash values to be assigned to the same block, is the complete identity of the proxy hash portion.

Each block comprises candidate hash values which exhibit some similarity. Fingerprints assigned to the same block are further compared using additional similarity tests and those fingerprints which pass the similarity tests are assigned to the same cluster (block 407).

Figure 6:
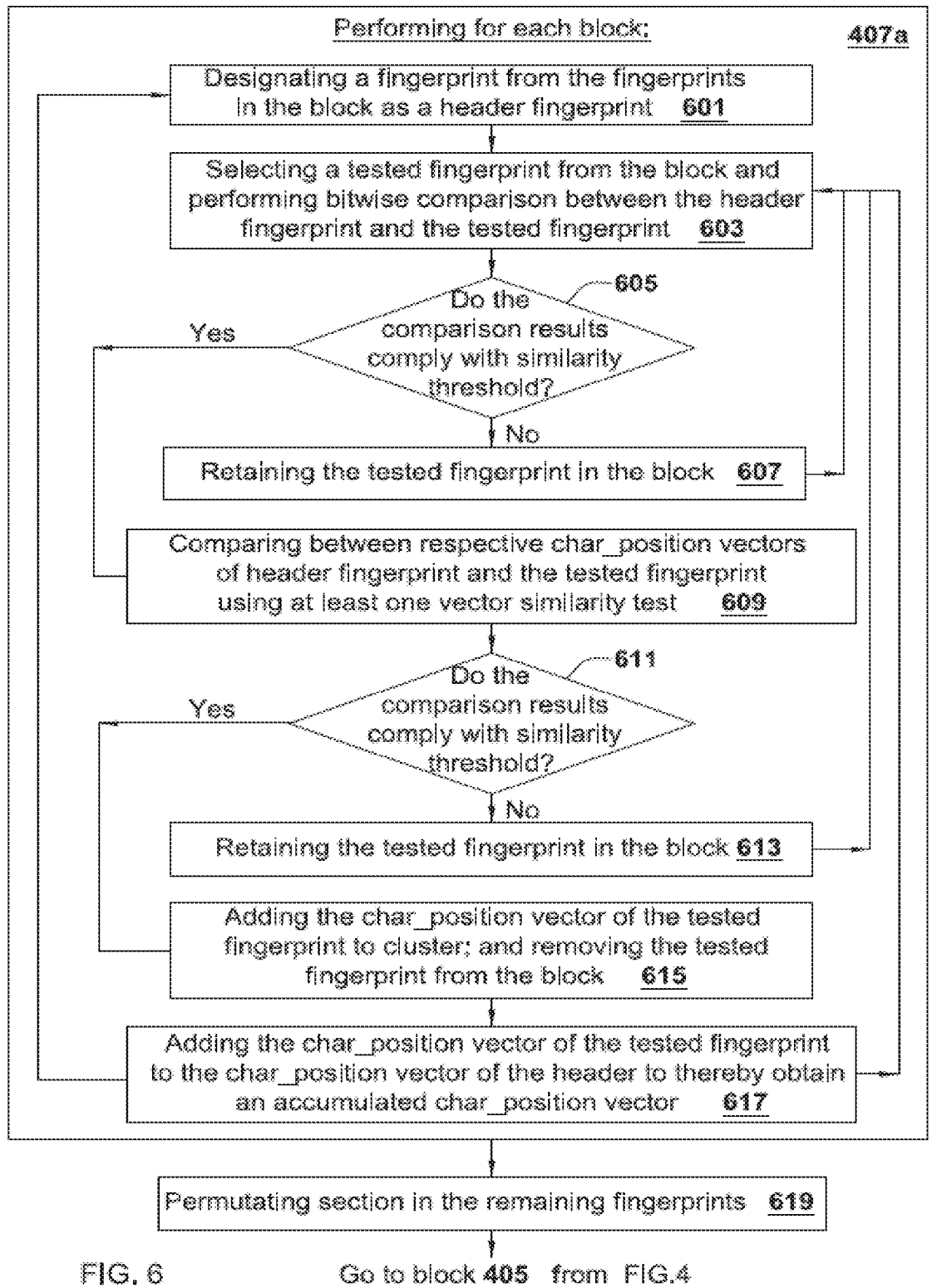
FIG. 6 is a flowchart of operations carried out during data-pattern matching, in accordance with an example of the presently disclosed subject matter.
Figure 8:
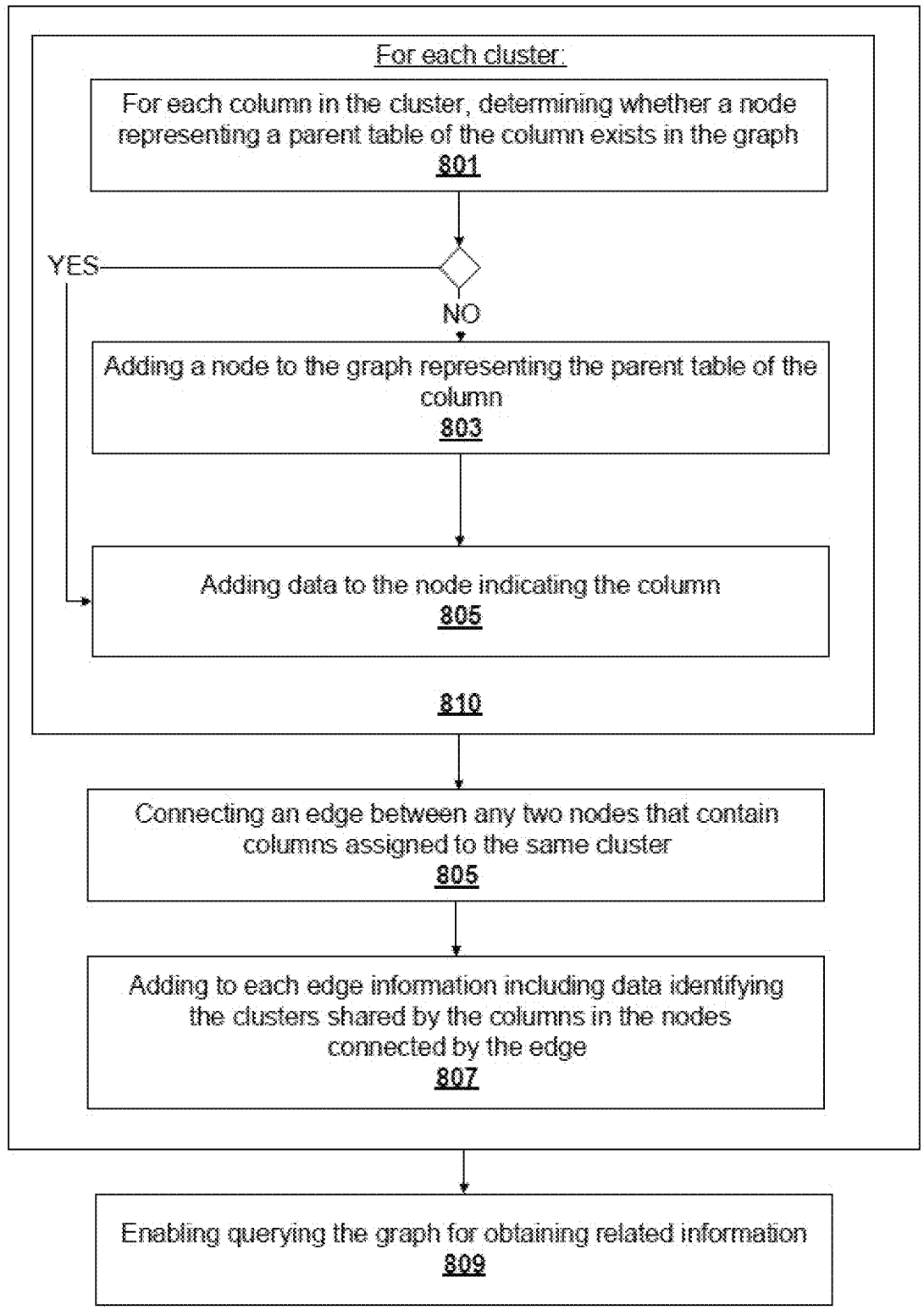
FIG. 8 is a flowchart of operations carried out during generation of a graph, in accordance with an example of the presently disclosed subject matter.

Turning to FIG. 8, this shows a flowchart of operations carried out during the pattern-matching process, according to some examples of the presently disclosed subject matter. FIG. 6 provides a detailed example of block 407 in FIG. 4. Notably, operations described with respect to FIG. 8 can be performed in parallel for a plurality of blocks, e.g., by distributing the processing of different blocks to different computer devices. A first fingerprint (FP) is selected from the fingerprints assigned to a given block (601). The first fingerprint (referred to herein below as a "header" FP) is used as the baseline fingerprint for comparison, where any additional fingerprint in the block is compared to the header FP. The header FP can be a fingerprint randomly selected from the fingerprints assigned to the block. The header fingerprint defines a respective cluster, where the respective column of the header FP is added to the cluster as well as any respective column of any additional fingerprint from the same block which passes the similarity tests (i.e., shows sufficient similarity to the header FP and also to the cumulative vector of the respective cluster, as further explained below).

Another fingerprint (referred to herein as a "tested" fingerprint) is randomly picked from the fingerprints in the block and compared, bitwise, with the header (803), the comparison referred to herein also as "second bitwise comparison" and the similarity referred to herein also as "second bitwise similarity". Since all FPs assigned to the same block share an identical proxy hash prefix/portion, bitwise similarity at this stage can be restricted to the remaining bits (e.g., in case of a 64 bits proxy hash and a 16 bits-prefix, only the remaining 48 bits are compared).

If the (second) bitwise similarity between the header FP and the tested FP does not comply with a predefined condition (for example, similarity is lower than a certain threshold, e.g., in case of 64 bits fingerprint, the number of differing bits is 9 or greater), the tested fingerprint is retained in the block (607) and the process reverts to operation 603, where a different (tested) fingerprint is selected and the process repeats.

Otherwise, if the (second) bitwise similarity between header FP and the tested FP complies with the condition (e.g., the number of differing bits is less than 9), one or more vector similarity tests are applied for comparing between the respective char_position vector of the header FP and the respective char_position vector of the tested FP (609). As mentioned above, examples of vector similarity tests include cosine similarity and Jaccard similarity. According to some examples, cosine similarity or Jaccard similarity is applied for comparing between the char_position vectors of the header FP and the other FP, while, according to another example, cosine and Jaccard similarity tests are applied.

If the result of the one or more vector similarity tests is below threshold, the tested fingerprint is retained in the block (613) and the process reverts to operation 603, where a different (tested) fingerprint is retrieved from the block and continues to operation 605. If, on the other hand, the result of the one or more vector similarity tests is above threshold (e.g., cosine similarity and Jaccard similarity scores are 0.9, and 0.7 respectively) the respective column of the tested FP is added to the cluster and the tested FP is removed from the block, so it is not compared a second time (615). At this point the cluster comprises two columns, the column of the header FP and the column of the tested FP. Notably, in some examples the second bitwise comparison is not performed, and similarity is determined based on the vector similarity test(s) alone.

According to some examples, each time a new column of a respective tested fingerprint is added to the cluster, the respective char_position vector of the newly added column is combined with an aggregated or cumulative char_position vector, generated from the combination of the respective char_position vector of the header and any other respective char_position vector of tested fingerprints previously added to the cluster. (617). When aggregating two char_position vectors, the values of overlapping char_position entries (i.e., corresponding to the same character occurring at the same position along the string) are combined, where a combined sum of the values in the two vectors replaces the previous value in the cha reposition vector of the header. Any non-overlapping entry, appearing in only one of the two vectors, is assumed to be assigned with the value 0 at the other vector, where it is missing. This process of char_position vector aggregation is repeated for every additional column that is added to the cluster.

In a subsequent iteration, following the updating of the char_position vector, bitwise comparison as described above with reference to operation 603 is performed between the original header FP and a newly picked tested FP, while comparison between vectors, using one or more vector similarity tests, as described above with reference to operation 609, is performed between the aggregated char_position vector of the cluster and the char_position vector of the tested FP. Aggregation of the char_position vectors in the same cluster helps to improve the result of the vector similarity tests as it reinforces overlapping values appearing in many char_position vectors and attenuates outlier values appearing sporadically in specific char_position vectors. As indicated by the arrow connecting operation 617 to operation 603, the process as disclosed above is repeated until all fingerprints in the block are selected as tested FPs and compared against the header.

At this point the process reverts to operation 601, where a new FP header is selected from the remaining fingerprints (assuming there are fingerprints remaining in the block) and the process as described according to operations 603 to 617 is repeated, where the new header FP is compared with tested fingerprints from among the remaining fingerprints in the block (those which were previously retained in the block), but not with any previous header FP, as such a comparison would be redundant.

The processing sequence as described above with reference to block 407a in FIG. 6 can be performed for each block in the group of blocks. At the end of the processing sequence, once all possible FP headers in ail blocks have been processed, in each block, part, or all of the fingerprints (and corresponding columns and char_position vectors) from the same block, are assigned to a specific cluster and removed from the block. The remaining fingerprints (if they exist), which were not found to be sufficiently similar to the header FP or their char_position vector was not found to be sufficiently similar to the char_position vector of the header, are retained in the block.

At this point the processing sequence is applied on a sub-group of the original pool of fingerprints, which includes the remaining (unmatched) fingerprints from all blocks and all the fingerprint headers (which now represent the "available proxy hash values"). Notably, the unmatched fingerprints can also be considered as fingerprint headers assigned to a cluster that comprises only one fingerprint, i.e., the respective fingerprint header.

To identify similar proxy hash values in the sub-group which have identical low order bits, the bits in each proxy hash value are permuted to thereby obtain a new fingerprint that preserves the previous Hamming distances (619). Following the permutation, the process reverts to block 405 where the permuted proxy hash values in the sub-group are processed as described above, e.g., by sorting the proxy hash values according to similarity of bits in their proxy hash portions and assigning them to new blocks according to the comparison results.

As mentioned above, proxy hash values can be divided into sections. According to this example, permutation of proxy hash values can be carried out by switching the position of sections (rather than individual bits) within the fingerprint's length and thus obtaining a new fingerprint that preserves the previous Hamming distances.

The newly generated blocks are then processed as described above with reference to block 407a in FIG. 6. This cycle is repeated where, in each iteration, a new permutation is applied on the remaining (unmatched) proxy hash values.

According to some examples, the process ends when all possible section permutations have been generated and ail possible respective output blocks have been checked for clusters. The number of required permutations is determined by the number of sections dividing the SimHash, it is advantageous if the number of sections exceeds the maximum number of allowed differing bits, since this allows similar SimHashes to be grouped into one contiguous block when sorted. Notably, the number of sections that the SimHash is divided into must be selected carefully because an excessively small number would lead to too many column vectors within one contiguous block (i.e., too many false positives), while an excessively large number would lead to an exceedingly high number of required permutations. As an example of an exceedingly high number of permutations, consider a scan with 1 million ($\cong 2^{20}$) columns, if 7 differing bits are allowed, dividing the SimHashes into 32 sections would require generating 3.37 E+6 different combinations (according to the number of combinations to choose 32−7=25 sections from a total of 32 sections), in a reverse example of choosing a too small number of sections, one may consider a scan with one million ($\cong 2^{20}$) columns, with 7 differing bits allowed, dividing the SimHash into 8 sections would result in $2^{20-8=12}$ columns on average in the same contiguous block. The high number of columns ending up in the same contiguous block results in many false positives and redundant computations to filter out non-similar columns.

As the char_position vector encodes the pattern of the data-values in each column and forms the basis for the fingerprints used in the above comparison, at the end of the above processing sequence, all the respective columns which share a similar data-value pattern are assigned to the same cluster. The clustering of columns can be used for identifying respective tables that share columns that contain the same type of data. This provides for automatic association between different data sources (e.g., tables) that share overlapping information (e.g., stored in columns) and, according to some examples, helps to execute operations on the tables, such as merging tables.

According to some examples, data sources can be grouped according to the observed similarity of different data-subsets within the data sources, in a specific example, considering two tables, each comprising a certain number of columns, in case columns from the different tables are assigned to common clusters, the tables can be assigned to the same group based on the observed similarity between the columns. According to one example, different data sources (e.g., tables) are grouped together in case a certain percentage of their data-subsets (e.g. columns) are assigned to the same cluster. In one specific case the percentage can be equal to 100, requiring that every data-subset in one data source is assigned to a cluster that is common to a data-subset of the other data source. When two data sources are compared, and one data source has a greater total number of data-subsets than the other data source (e.g., comparing between a first table comprising 100 columns and another table comprising 90 columns), the percentage of commonly assigned data-subsets can be applied on the data source with the lesser number of data-subsets, thus enabling to identify data sources which are inclusive of other data sources.

In some examples, once assigned to clusters, each cluster can be tagged according to the specific type of data in the columns that are assigned to the cluster, in addition to manual tagging that can be performed by a human, automatic tagging (computer generated tagging) can be applied based on various rules. For instance, assuming most of the columns which are assigned to the same cluster have a certain descriptive title (e.g., "Phone number" or "Name"), all columns in the cluster can be tagged based on the predominant title. In another example, the pattern of a certain cluster can be processed (e.g., using machine learning methods) to identify the type of data in the column, and the columns in the cluster can be tagged accordingly.

As mentioned above, data-pattern matching according to the presently disclosed subject matter is not limited to SimHash and can be implemented using other types of proxy hash functions such as MinHash. Similar to SimHash, using MinHash can also serve to avoid pairwise comparisons that result in a quadratic time complexity of $O(n^2)$.

Similar to SimHash, using MinHash helps to significantly reduce the search space when MinHash is combined with the concept of Locality-sensitive hashing (LSH). In short, to use MinHash values for this purpose, first a list of Minhash values are generated for the char_position vector, representing a feature vector of each data-subset. The vector comprises a list of features and their respective frequencies (e.g. [('Y_0', 120), ('N_0', 60), ('e_1', 120), ('o_1', 60), ('s_2', 120)]). A MinHash is calculated for the char_position vector as explained below with respect to block 701, where in some examples each character-position pair (e.g., Y_O) in the char_position vector can serve as a discrete data value for the purpose of calculating the MinHash. Once calculated, the MinHash values are divided into bands where each band comprises one or more contiguous individual MinHash values. Thereafter, a hash function is applied on a concatenation of all MinHash values within each band. Assuming N bands are applied, N band-hash values are obtained.

Each band-hash value is used as a reference to a reservoir (bucket) and the feature vector that, yielded this hash value is assigned to the bucket. Comparison between pairs of data-subsets is performed only between subsets that share one or more common buckets (in case both data-subsets comprise an identical bucket), thereby significantly reducing the number of required comparisons. Notably, the choice of number of bands, and consequently the number of rows, affects the number of false negatives. Generally, a higher number of bands will result in less false positives with the cost of more comparisons, and vice versa. Methods of selecting a suitable number of bands are well known in the art and therefore are not discussed herein in detail.

The buckets serve in a manner similar to blocks described above with respect to SimHash implementation. As part of the data-pattern matching, in some examples, the concatenated MinHash value of different data-subsets which share at least one common bucket are compared (for consistency as in the case of SimHash, this comparison is also referred to herein as a "second bitwise comparison" and the similarity is referred to herein also as "second bitwise similarity").

One or more vector similarity tests are applied on any pair of proxy hash values that exhibit MinHash similarity (second bitwise similarity) greater than a certain threshold. In case the vector similarity tests also exhibit similarity above a threshold value, the respective data-subsets are assigned to the same cluster. Notably, the operations described above with respect to FIGS. 4, 5, 6, 7 and 8 can also be applied with the difference that proxy hash values are assigned to blocks (buckets) using MinHash.

Reverting to operation 409 in FIG. 4, once all fingerprints are assigned to a respective cluster, in some cases it may be further desired to perform data-content matching to identify data-subsets (e.g., columns) in the same cluster that share not only the same (or similar) pattern, but also identical content (data-values).

FIG. 7 is a flowchart of operations carried out during a data-content matching process, according to some examples of the presently disclosed subject matter. During data-content matching, the columns assigned to each cluster are compared, and the overlap between the data-values in each pair of columns is determined. This process can be performed on all clusters or on a selected sub-group of the clusters. Operations describes with reference to FIG. 7 can be executed for example by data-content matching module 204.

For each column in a given cluster, a MinHash vector is calculated (701). A MinHash vector comprises a plurality (N) of hash values. Notably, in some examples the MinHash vectors are calculated during previous stages following the data retrieval from the data sources, e.g., about the same time the char_position vector is generated.

Assuming for example a column that comprises M rows, each cell comprising a respective data-value, a MinHash vector is calculated as follows:

Each one of N hash functions is applied on each of the values in the column, giving rise to M hash values. A minimum value (Min) of all M hash values is selected and added to the vector, filling the vector with N (Min) hash values.

The MinHash vectors generated for different columns in the duster are compared, and similarity between columns is determined (703). To this end, the hash values in one MinHash vector of a first column are compared with hash values in other MinHash vectors of other columns in the duster. Similarity between MinHash vectors provides a good estimation of the similarity between the two original sets that were hashed (e.g., Jaccard similarity). According to the presently disclosed subject matter, this principle is used for estimating similarity between the columns, which is inferred based on the identity between the hash values in two different MinHash vectors (e.g., percentage of identical hash values in the two vectors). Once determined, the degree of overlapping values between columns in the same duster (e.g., represented by an overlapping score) is stored in a computer storage device (e.g., operatively connected to processing circuitry 200).

According to some examples, each column is associated with specific buckets, where each bucket is provided for a unique hash value in the MinHash vector. Assuming for example two MinHash vectors are being processed, the first vector is linked to a plurality of buckets, each bucket corresponding to a unique hash value in the vector. In case the second MinHash vector comprises at least one hash value that is linked to a bucket, previously linked to the first vector, the two vectors are compared one against the other, and the percentage of identical hash values in the two vectors is determined. Since two columns having mutually exclusive content will not be associated with the same bucket, this approach helps to avoid unnecessary comparison operations between MinHash vectors of columns which have no overlapping data-values. Notably, as explained above, in some examples, each MinHash vector is divided into bands comprising a predefined number of MinHash values and a respective bucket is calculated for each band by calculating a hash value of the concatenated hash values in the band. However, since in the particular example described herein, each band comprises a single hash value, each hash value corresponds to a respective bucket.

This process can be repeated for all MinHash vectors, of all respective columns, which are assigned to the same cluster to thereby identify identical columns, near identical columns, and columns that are subsets of other columns.

According to some examples, only a sample of the cells (m cells, where m can be m<<M) in each column are used for creating the MinHash vector, thus reducing the number of hash values which are calculated, and, as a result, reducing the processing load. The similarity between columns in the same cluster (degree of content overlap) is inferred based on the calculated similarity of respective sampled values.

The inferred similarity between two columns can be determined using the following equation:

$$Overlap_{original} = Overlap_{sample}/(u_{sA}/u_{tA} \times u_{sB}/u_{tB})$$

Where $overlap_{sample}$ is the number of overlapping data-values in the sample. $u_{sA}$ and $u_{sB}$ refer to the number of unique sampled data-values from columns A and B, respectively, and $u_{tA}$ and $u_{tB}$ refer to the number of total unique data-values from columns A and B, respectively.

Content matching between columns can be used for identifying respective tables that share columns that contain overlapping content.

Reverting to operation 411 in FIG. 4, according to some examples of the presently disclosed subject matter, the results of the data-pattern matching process and data-content matching process described above, namely the clusters of similar-pattern columns and the pairs of similar-content columns (columns with overlapping data) are converted into a graph representation. As further explained below, the graph representation allows to create a convenient and user-friendly working environment, which allows to analyze and manipulate the obtained data more easily.

FIG. 8 is a flowchart of operations performed during the generation of a graph, according to examples of the presently disclosed subject matter. Operations described with reference to FIG. 8 can be executed for example by graph management module 206.

In some examples, each cluster in the collection of clusters is processed and for each column in the duster that is being processed, it is determined whether a node representing the parent table that contains the column already exists in the graph, (801) and, if not, a respective node representing the parent table is added to the graph (803). Data indicating the column is added to the node (80S), such that each node comprises data indicative (e.g., in a form of a list) of ail columns that share a cluster with one or more columns in one or more other nodes.

For each pair of nodes that comprise columns assigned to the same cluster, if an edge connecting between the nodes does not exist, it is added to the graph (805). This operation effectively creates a link between the respective parent tables of the respective pair of columns, which are represented by the nodes. Once created, additional data are added to the edge (807), which includes for example:

a) a cluster ID, uniquely identifying the cluster to which the pair of columns belong.

b) data indicating whether the columns comprise overlapping data and the overlap score (i.e., the similarity score of columns in the same cluster, determined as described above with reference to FIG. 7); and c) summary of the total number of unique and non-unique columns that are connected between the tables, where a unique connection is one that connects columns where at least one of the columns is a column with a ratio of unique/total values above a certain value e.g., 0.01. Conversely, a non-unique connection is a connection between two columns, both containing non-unique values, i.e., the values in the columns appear multiple times.

Reverting to FIG. 3, it shows an illustrated example of a graph (37) comprising 5 nodes, each corresponding to a respective table. The illustration further shows, in enlarged view, the nodes representing table 1 and table 2 and the edge connecting these two nodes. As shown, each one of the two nodes comprises a list of all their columns. The edge connecting the two nodes contains information indicative of columns-pairs (i.e., columns which are assigned to the same cluster). As further illustrated, in some examples, the edge may also include information indicating whether the columns-pair contain overlapping data-values, and possibly also a summary of the total number of unique and non-unique columns.

Once the graph is ready and available, it enables to perform all sorts of complex queries in an efficient manner (809). Examples of such queries include:

Most connected tables—a query requesting to retrieve all the tables that have the highest number of connected tables.

Near-duplicate tables—a query requesting to retrieve all the tables where more than 80% of their columns are connected to another table with approximately the same number of records and also share data-values.

Connected tables with a specific column—a query requesting to retrieve ail the tables that include a specific column (e.g., phone number column) where more than 50% of their columns are connected to other tables.

The presently disclosed subject matter further contemplates a user interface being operatively connected to the data management module 206 and being capable of receiving queries from the user and presenting to the user the requested information. In some examples a user interface module 208 is configured to generate a graphical user interface adapted for receiving queries from the user, extracting the requested information from the graph, and displaying the extracted information to the user.

According to some examples, the data management module 206 operates as a lower layer interfacing with the graph and the user interface operates as a higher layer providing an interface tool to the user. A user interfacing with the DBS 100 and issuing queries may have several options of viewing the data-pattern matching results.

According to one non-limiting example, the user may issue a request to obtain from the graph a list of all tables sorted by the number of similar other tables (sharing columns comprising similar data-patterns and possibly also similar content). The user interface and data management module enable to perform various operations on the data output of the clustering process, for example applying different filters on the reported clusters, to obtain and display specific types of data, such as tables that contain personal information (PI), tables which are characterized by open access (not restricted table), fables with specific labeling, etc.

According to another non-limiting example, the user may issue a request, indicating a specific table and requesting all similar tables. This report lists the similar columns for each reported fable and the features that are considered similar. For example, some of the columns may be considered similar because of their content, while others may be considered similar because they share the same data pattern, although not the same data instances.

It will also be understood that the system according to the presently disclosed subject matter may be a suitably programmed computer. Likewise, the presently disclosed subject, matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized method of clustering data-subsets of one or more structured or semi-structured data sources, each data-subset comprising data-values, the method comprising using a processing circuitry for:

generating, for each data-subset in a group of data-subsets extracted from the one or more structured or semi-structured data sources, a respective vector indicative of characters position distribution in data-values in the data-subset, thereby giving rise to a group of vectors;

calculating, for each vector in the group of vectors, a respective proxy hash value;

applying a first bitwise comparison and assigning different proxy hash values to respective blocks according to observed bitwise similarity between the proxy hash values;

for each block, performing data-pattern matching of respective data-subsets of proxy hash values in the block, comprising:

for at least one pair of proxy hash values in the block, applying at least one vector similarity test on respective vectors of the pair of proxy hash values;

and in case the result of the at least one vector similarity test is greater than a first predefined threshold value, assigning the respective data-subsets of the pair of proxy hash values to a common cluster, wherein the data-values in data-subsets assigned to the common cluster share similar data-patterns.

2. The computerized method of claim 1, wherein data-pattern matching further comprises:

for each block:

designating a first proxy hash value from the proxy hash values in the block as a header proxy hash, wherein the header proxy hash is assigned to a respective cluster;

(a) for each of the remaining proxy hash values in the block:

selecting a tested proxy hash value from the block, wherein the at least one vector similarity test is applied on a respective vector of the header proxy hash and the respective vector of the tested proxy hash;

in case the at least one vector similarity test exhibits similarity greater than threshold, assigning the respective data-subsets of the tested proxy hash to the respective cluster and removing the tested hash value from the block;

otherwise, retaining the tested proxy hash value in the block;

repeatedly applying (a) on proxy hash values remaining in the block, each time with a different tested proxy hash value; and once all proxy hash values in the block have been selected, designating a new header proxy hash value from the remaining proxy hash values in the block, and repeating (a).

3. The computerized method of claim 2, wherein (a) further comprises:

in case the at least one vector similarity test exhibits similarity greater than a threshold, combining the respective vector of the header proxy hash and the respective vector of the tested proxy hash value, giving rise to an accumulated vector of the header proxy hash; and using the accumulated vector in place of the respective vector of the header following application of (a).

4. The computerized method of claim 1, wherein the data-pattern matching of respective data-subsets of proxy hash values in the block, further comprises: applying a second bitwise comparison between different proxy hash values in the block, and applying the at least one vector similarity test only on any pair of proxy hash values that exhibit bitwise similarity greater than a second predefined threshold value.

5. The computerized method of claim 4, wherein data-pattern matching further comprises:

for each block:

designating a first proxy hash value from the proxy hash values in the block as a header proxy hash, wherein the header proxy hash is assigned to a respective cluster;

(a) for each of the remaining proxy hash values in the block:

selecting a tested proxy hash value from the block, wherein the second bitwise comparison is applied on the header proxy hash and the tested proxy hash and the at least one vector similarity test is applied on the respective vector of the header proxy hash and the respective vector of the tested proxy hash;

in case the second bitwise comparison and the at least one vector similarity test exhibit similarity greater than threshold, assigning the respective data-subsets of the tested proxy hash to the respective cluster and removing the tested hash value from the block;

in case the header proxy hash and the tested hash value do not exhibit bitwise similarity greater than threshold, retaining the tested proxy hash value in the block;

repeatedly applying (a) on proxy hash values remaining in the block, each time with a different selected tested proxy hash value; and once all proxy hash values in the block have been selected, designating a new header proxy hash value from the remaining proxy hash values in the block, and repeating (a).

6. The computerized method of claim 5, wherein (a) further comprises:

in case the second bitwise comparison and the at least one vector similarity test exhibits similarity greater than a threshold, combining the respective vector of the header proxy hash and the respective vector of the tested proxy hash value, giving rise to an accumulated vector of the header proxy hash; and using the accumulated vector in following application of (a) in place of the respective vector of the header.

7. The computerized method of claim 6, wherein the proxy hash values are sampled proxy hash values, calculated using only a sample of the data-values in each data-subset; the method further comprising: inferring similarity between different data-subsets in the cluster based on observed similarity between sampled proxy hash values;

wherein the inferring is performed using the following equation:

$$\text{Overlap}_{original} = \text{Overlap}_{sample}/u_{sA}/u_{tA} \times u_{sB}/u_{tB})$$

where:

'overlap' is the number of overlapping sampled data-values in data-subset A and data-subset B;

'$u_{sA}$' is a number of unique sampled data-values from data-subsets A;

'$u_{sB}$' is a number of unique sampled data-values from data-subsets B;

'$u_{tA}$' is a number of total unique values from data-subset A; and

'$u_{tB}$' is a number of total unique from data-subset B.

8. The computerized method of claim 1, wherein the first bitwise comparison includes performing bitwise comparison between respective portions of the proxy hash values.

9. The computerized method of claim 1, further comprising generating a graph representing the clusters, comprising:

for a given cluster, for each data-subset:

determining whether there exists in the graph a respective node representing a parent table of the data-subset, and, if not, adding the respective node to the graph;

adding to the respective node, data indicative of the data-subset; and connecting, by an edge, any two nodes in the graph that contain data-subsets assigned to the same cluster.

10. The computerized method of claim 9, further comprising adding to the edge data identifying clusters shared by the data-subsets in the nodes connected by the edge, and one or more of:

a) data indicative whether the data-subsets in the nodes connected by the edge contain overlapping data-values; and b) a summary of a total number of unique and non-unique data-subsets.

11. The computerized method of claim 1, further comprising classifying the cluster to a specific type of data.

12. The computerized method of claim 1, further comprising, for at least one given cluster:

for each data-subset assigned to the given cluster, calculating a respective proxy hash value, giving rise to a collection of proxy hash values;

comparing between the respective proxy hash values in the collection; and identifying different data-subsets in the cluster that share overlapping data-values, based on the results of the comparison.

13. A computerized system adapted for clustering data-subsets of one or more structured or semi-structured data sources, each data-subset comprising data-values, the system comprising at least one processing circuitry configured to:

generate, for each data-subset in a group of data-subsets extracted from the one or more structured or semi-structured data sources, a respective vector indicative of characters' position distribution in data-values in the data-subset, thereby giving rise to a group of vectors;

calculate, for each vector in the group of vectors, a respective proxy hash value;

apply a first bitwise comparison and assigning different proxy hash values to respective blocks according to observed bitwise similarity between the proxy hash values;

for each block, perform data-pattern matching of respective data-subsets of proxy hash values in the block, comprising:

for at least one pair of proxy hash values in the block, apply at least one vector similarity test on respective vectors of the pair of proxy hash values;

and in case the result of the at least one vector similarity test is greater than a first predefined threshold value, assign the respective data-subsets of the pair of proxy hash values to a common cluster, wherein the data-values in data-subsets assigned to the common cluster share similar data-patterns.

14. The computerized system of claim 13, wherein the processing circuitry is further configured to classify the cluster to a specific data type.

15. The computerized system of claim 13, wherein the processing circuitry is further configured for data-pattern matching to:

for each block:
  designate a first proxy hash value from the proxy hash values in the block as a header proxy hash, wherein the header proxy hash is assigned to a respective cluster;
  execute (a), comprising:
    for each of the remaining proxy hash values in the block:
      selecting a tested proxy hash value from the block, wherein the at least one vector similarity test is applied on the respective vector of the header proxy hash and the respective vector of the tested proxy hash;
      in case the at least one vector similarity test exhibits similarity greater than a threshold, assigning the respective data-subsets of the tested proxy hash to the respective cluster and removing the tested hash value from the block;
      otherwise, retaining the tested proxy hash value in the block;
    repeatedly applying (a) on proxy hash values remaining in the block, each time with a different tested proxy hash value.

16. The computerized system of claim 15, wherein the processing circuitry is further configured, once all proxy hash values in the block have been selected, to designate a new header proxy hash value from the remaining proxy hash values in the block, and repeating (a).

17. The computerized system of claim 16, wherein (a) further comprises:
  in case the at least one vector similarity test exhibits similarity greater than a threshold, combining the respective vector of the header proxy hash and the respective vector of the tested proxy hash value, giving rise to an accumulated vector of the header proxy hash; and
  using the accumulated vector in place of the respective vector of the header in a subsequent application of (a).

18. The computerized system of claim 17, wherein the first bitwise comparison includes performing bitwise comparison between respective portions of the proxy hash values.

19. The computerized system of claim 13, wherein data-pattern matching of respective data-subsets of proxy hash values in the block, further comprises: applying a second bitwise comparison between different proxy hash values in the block, and applying the at least one vector similarity test only on any pair of proxy hash values that exhibit bitwise similarity greater than a second predefined threshold value.

20. The computerized system of claim 19, wherein data-pattern matching further comprises:

for each block:
  designate a first proxy hash value from the proxy hash values in the block as a header proxy hash, wherein the header proxy hash is assigned to a respective cluster;
  (a) for each of the remaining proxy hash values in the block:
    selecting a tested proxy hash value from the block, wherein the second bitwise comparison is applied on the header proxy hash and the tested proxy hash and the at least one vector similarity test is applied on the respective vector of the header proxy hash and the respective vector of the tested proxy hash;
    in case the bitwise comparison and the at least one vector similarity test exhibit similarity greater than a threshold, assigning the respective data-subsets of the tested proxy hash to the respective cluster and removing the tested hash value from the block;
    in case the header proxy hash and the tested hash value do not exhibit bitwise similarity greater than a threshold, retaining the tested proxy hash value in the block;
  repeatedly applying (a) on proxy hash values remaining in the block, each time with a different selected tested proxy hash value.

21. The computerized system of claim 20, wherein the processing circuitry is further configured, once all proxy hash values in the block have been selected, to designate a new header proxy hash value from the remaining proxy hash values in the block, and repeat (a).

22. The computerized system of claim 20, wherein (a) further comprises:
  in case the second bitwise comparison and the at least one vector similarity test exhibits similarity greater than a threshold, combining the respective vector of the header proxy hash and the respective vector of the tested proxy hash value, giving rise to an accumulated vector of the header proxy hash; and
  using the accumulated vector in a subsequent application of (a) in place of the respective vector of the header.

23. The computerized system of claim 13, wherein the processing circuitry is configured for calculating, for each vector in the group of vectors, a respective proxy hash value, to execute a proxy hash function that retains a correlation between an input vector and a respective output proxy hash value.

24. The computerized system of claim 13, wherein the processing circuitry is further configured to execute, for at least one given cluster:
  for each data-subset assigned to the given cluster, calculate a respective proxy hash value, giving rise to a collection of proxy hash values;
  compare between the respective proxy hash values in the collection; and
  identify different data-subsets in the cluster that share overlapping data-values, based on the results of the comparison.

25. The computerized system of claim 24, wherein the proxy hash values are sampled proxy hash values, calculated using only a sample of the data-values in each data-subset, the processing circuitry being further configured to infer similarity between different data-subsets in the cluster, based on the observed similarity between sampled proxy hash values.

26. The computerized system of claim 25, wherein the inferring is performed using the following equation:

$$\text{Overlap}_{original} = \text{Overlap}_{sample} / (u_{sA}/u_{tA} \times u_{sB}/u_{tB})$$

where:
  'overlap' is the number of overlapping sampled data-values in data-subset A and data-subset B;
  $u_{SA}$ is number of unique sampled data-values from data-subsets A;
  $u_{SB}$ is number of unique sampled data-values from data-subsets B;
  $u_{tA}$ is number of total unique values from data-subset A; and
  $u_{tA}'$ is a number of total unique values from data-subset A; and
  '$u_{tB}$ is number of total unique from data-subset B.

27. The computerized system of claim 13, wherein the processing circuitry is further configured to generate a graph representing the clusters, comprising:
  for a given cluster, for each data-subset:
  determine whether there exists in the graph a respective node representing a parent table of the data-subset, and, if not, adding the respective node to the graph;
    add to the respective node, data indicative of the data-subset; and
    connect, by an edge, any two nodes in the graph that contain data-subsets assigned to the same cluster.

28. The computerized system of claim 27, wherein the processing circuitry is further configured to add to the edge data identifying clusters shared by the data-subsets in the nodes connected by the edge, and
  one or more of:
  a. data indicative whether the data-subsets in the nodes connected by the edge contain overlapping data-values; and
  b. a summary of a total number of unique and non-unique data-subsets.

29. The computerized system of claim 13, wherein the processing circuitry is further configured to generate a graphical user interface enabling a user to interact and query the graph.

30. A non-transitory computer readable storage medium tangibly embodying a program of instructions that, when executed by a computer, causing the computer to perform a computerized method of clustering data-subsets (e.g. columns) of one or more structured or semi-structured data sources (e.g. tables), each data-subset comprising data-values, the method comprising using a processing circuitry for:
  generating, for each data-subset in a group of data-subsets extracted from the one or more structured or semi-structured data sources, a respective vector indicative of characters' position distribution in data-values in the data-subset, thereby giving rise to a group of vectors;
  calculating, for each vector in the group of vectors, a respective proxy hash value;
  applying a first bitwise comparison and assigning different proxy hash values to respective blocks according to observed bitwise similarity between the proxy hash values;
  for each block, performing data-pattern matching of respective data-subsets of proxy hash values in the block, comprising:
  for at least one pair of proxy hash values in the block, applying at least one vector similarity test on respective vectors of the pair of proxy hash values;
  and in case the result of the at least one vector similarity test is greater than a predefined threshold value, assigning the respective data-subsets of the pair of proxy hash values to a common cluster, wherein the data-values in data-subsets assigned to the common cluster share similar data-patterns.

* * * * *